Dec. 23, 1952   A. H. HEINRICH   2,622,905
SEALING RING
Filed Dec. 23, 1948

INVENTOR.
AUGUST H. HEINRICH
BY
Milburn & Milburn
ATTORNEYS

Patented Dec. 23, 1952

2,622,905

UNITED STATES PATENT OFFICE 2,622,905

SEALING RING

August H. Heinrich, Euclid, Ohio, assignor to The Auto-Diesel Piston Ring Company, Cleveland, Ohio, a corporation of Ohio Application December 23, 1948, Serial No. 66,859

1 Claim. (Cl. 288—2)

This invention is for an improved form of sealing ring, the present application being related to my co-pending application Serial No. 11,565, Filed February 27, 1948.

As in my co-pending application, supra, so here also the invention is directed in a general way to a sealing ring of metal or other suitable non-compressible material and rubber or rubber-like material bonded together into a unitary resilient body.

The object of my present invention is to devise such a ring that can be employed either as a cylinder seal, shaft seal or end seal without requiring any modification of the ring.

More specifically, my object is to provide such a ring in which the sealing medium is exposed for sealing engagement circumferentially in a continuous manner upon both the inside and outside thereof and also upon both of the opposite faces thereof.

My present invention includes also as one of its objects the method of making my present improved form of ring as well as the completed ring itself.

Other objects will appear from the following description and claims when considered together with the accompany drawing.

It is to be understood that the present form of disclosure is merely for the purpose of illustration and that there might be devised various modifications thereof without departing from the spirit of my invention as herein set forth and claimed.

In carrying out my present invention, I first form each of a pair of flat duplicate rings 1 of any suitable metal or other non-compressible material, with an annular groove 2 and radially extending slots 3, the groove and slots being of sufficient depth to serve their intended purpose, as will be explained, and being formed upon the same side of the ring 1 in each instance. The groove and slots may of V-shape in cross section and the edges of the mouth of the groove will be spaced from the edges of the ring member in which it is formed.

Figure 1:
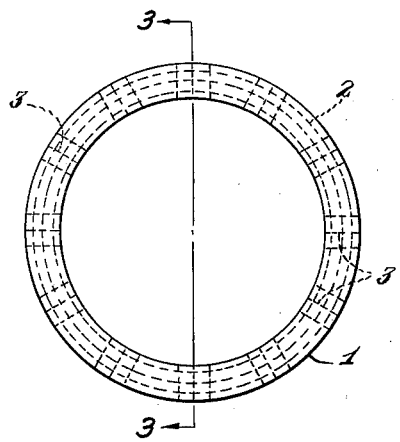
Fig. 1 is a face view of an incompleted form of my present ring.
Figure 2:
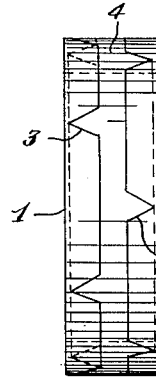
Fig. 2 is a side view thereof.
Figure 3:
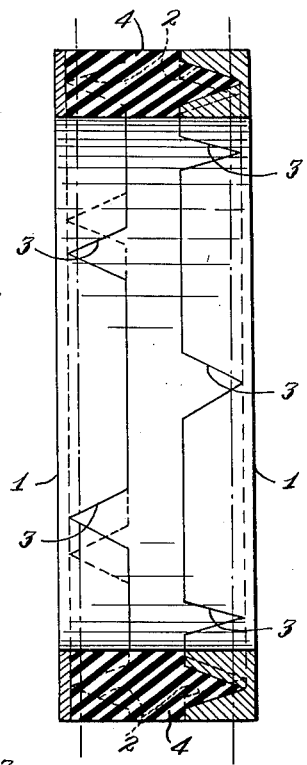
Fig. 3 is a sectional view taken on line 3—3 of Fig. 1.

Then these two ring members are arranged in coaxially spaced relation to each other, with their groove and slots facing each other and preferably with the slots of the two rings staggered with respect to each other. A suitable sealing medium 4, as for instance rubber or rubber-like material, is applied to the space between the two rings themselves and also to the grooves and slots so as to fill the same. Then these laminations of metal and rubber are bonded together into a single unitary body. (See Figs. 1, 2 and 3 of the present drawing.)

Figure 5:
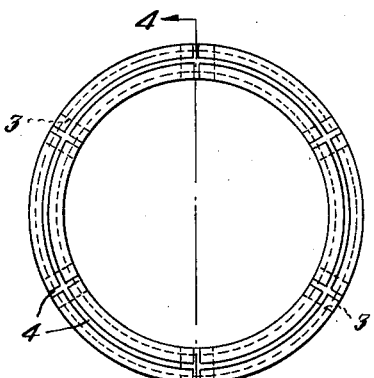
Fig. 5 is a front face view of the finished ring.
Figure 4:
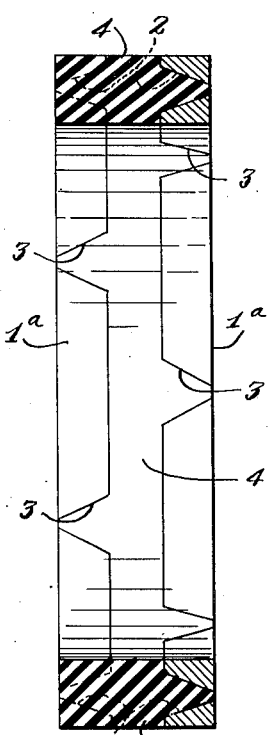
Fig. 4 is a view similar to Fig. 3, except that in the condition of the ring illustrated in Fig 4 the finishing operation has been performed.
Figure 6:
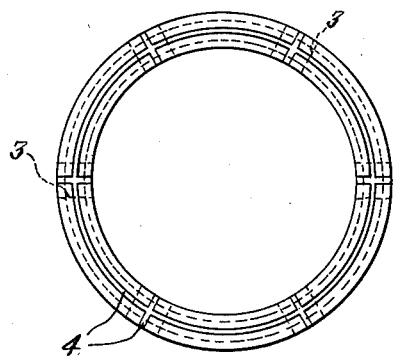
Fig. 6 is a rear face view of the finished ring.

The next step consists in removing metal from both outer faces of this assembly to the point of exposing the ruber in the bottom part of the grooves 2 and each of the slots 3. (See Figs. 4, 5 and 6 of the drawing.) The result is that the original metal rings 1 now become multiple annular series of spaced segments 1a of metal which are joined by the resilient rubber. To be more specific, there is obtained a unitary body comprising co-axially spaced multiple annular series of segments 1a of metal in which the annular series of segments, which are separted by the groove 2, are spaced from each other radially and the segments of the one multiple annular series are staggered with respect to those of the co-axially spaced multiple annular series.

Consequently this completely closed or continuous form of ring is of composite unitary character; it is resilient radially and circumferentially and in fact in practically every direction; and it has its sealing medium exposed continuously about the entire inner and outer perimeters and also about each of its two faces. Thus this single form of ring may be regarded as having universal sealing and as being universally resilient for all of the several uses to which it might be put, as above suggested. That is to say, this same ring without change may be used for either inside or outside sealing engagement, as for instance in the case of a rotary or reciprocating shaft, and may also be used as an end seal.

This ring will occupy the same position in the assembly as in the case of other sealing rings and there will be required no modification of the mechanism in effecting the application of the sealing ring thereto. This ring may be made of various sizes and may be adopted in conventional assemblies, as for instance the over-all dimensions of my present finished ring may be such as to permit application thereof to the conventional grooves of pistons or to the grooves for sealing rings in the case of either a rotary or reciprocating shaft.

The resilience of this ring in practically all directions will facilitate its assembly or disassembly while the radial projection of the rubber, due to the longitudinal compression of the ring, will serve to ensure most effective and dependable sealing with means of automatic compensation by virtue of the character and the structural arrangement of the sealing medium as part of the composite ring. The metallic nature of the ring will serve to maintain its general form but without interfering with the resilient nature of the ring. This ring may be made of continuous or uninterrupted form and is complete in itself, requiring no other means for effecting the desired sealing between the parts to which applied.

The flexible compressibility of this ring in the case of end sealing will provide compensation for lack of perfect alignment along a longitudinal axis somewhat after the manner of a universal coupling. Also, compression of this ring along its longitudinal axis will produce sufficient protrusion of the rubber radially to ensure even more effective and dependable sealing engagement, as above pointed out. With this in mind, this ring may be made slightly over-size in the direction of the longitudinal axis, if so desired. Also, in an assembly embodying my present form of ring, there may be employed any desired number of rings according to the requirements in any given case.

The several practical advantages which flow from this composite unitary ring are believed to be obvious from the above; and other advantages may suggest themselves to those who are familiar with the art to which this invention relates.

In the following claims the word "ring" is employed as a matter of convenience and is to be interpreted in a generic sense and is not to be understood as limiting the present invention to any particular form of my bonded composite sealing member which may be of various forms according to the conditions of use in any given case. For instance, my sealing member may be of either closed form, as herein illustrated, or of open or split form. These and other variations which will suggest themselves to those who are familiar with the art to which this invention relates, are intended to be comprehended by my present invention.

What I claim is:

A sealing ring comprising co-axially spaced multiple annular series of segments of metal, the annular arrangement of segments of each multiple series being spaced from each other radially, the individual segments of each annular series being spaced from each other circumferentially, the segments of the one multiple annular series being staggered with respect to those of the co-axially spaced multiple annular series, and rubber-like material filling the space between said segments and being exposed for sealing engagement continuously circumferentially upon both the inside and outside thereof and upon both of the opposite faces thereof, and said metal and rubber-like material being bonded together into a unitary radially and circumferentially resilient annular body.

AUGUST H. HEINRICH.

REFERENCES CITED

The following references are of record in the file of this patent:

UNITED STATES PATENTS

| Number | Name | Date |
|---|---|---|
| 1,488,695 | Miller | Apr. 1, 1924 |
| 2,148,038 | Raybould | Feb. 21, 1939 |
| 2,263,815 | Northrup et al. | Nov. 25, 1941 |
| 2,310,405 | Dodge | Feb. 9, 1943 |
| 2,382,245 | McCormack | Aug. 14, 1945 |

FOREIGN PATENTS

| Number | Country | Date |
|---|---|---|
| 583,348 | Great Britain | of 1946 |